United States Patent [19]

Lee

[11] Patent Number: 4,558,600

[45] Date of Patent: * Dec. 17, 1985

[54] FORCE TRANSDUCER

[75] Inventor: Shih-Ying Lee, Lincoln, Mass.

[73] Assignee: Setra Systems, Inc., Acton, Mass.

[*] Notice: The portion of the term of this patent subsequent to May 15, 2001 has been disclaimed.

[21] Appl. No.: 494,450

[22] Filed: May 13, 1983

Related U.S. Application Data

[63] Continuation-in-part of Ser. No. 359,619, Mar. 18, 1982, Pat. No. 4,463,614, which is a continuation-in-part of Ser. No. 265,087, May 19, 1981, Pat. No. 4,448,085.

[51] Int. Cl.⁴ .................................................. G01L 1/14
[52] U.S. Cl. ............................. 73/862.64; 177/210 C; 361/283
[58] Field of Search .................... 73/862.62, 862.64; 177/210 C, 229; 361/283

[56] References Cited

U.S. PATENT DOCUMENTS

| | | | |
|---|---|---|---|
| 3,371,526 | 3/1968 | Fathauer | 73/862.64 |
| 3,443,653 | 5/1969 | Marshall . | |
| 3,590,933 | 7/1971 | Forman . | |
| 3,602,866 | 8/1971 | Saxl | 73/862.64 X |
| 3,986,571 | 10/1976 | Strobel et al. . | |
| 4,020,686 | 5/1977 | Brendel . | |
| 4,022,288 | 5/1977 | Canevari . | |
| 4,043,415 | 8/1977 | Luchinger | 177/255 |
| 4,062,416 | 12/1977 | Berg et al. . | |
| 4,062,417 | 12/1977 | Kunz . | |
| 4,065,962 | 1/1978 | Shoberg . | |
| 4,072,202 | 2/1978 | Storace . | |
| 4,143,727 | 3/1979 | Jacobson . | |
| 4,153,124 | 5/1979 | Knothe et al. . | |
| 4,153,126 | 5/1979 | Knothe et al. . | |
| 4,168,518 | 9/1979 | Lee | 73/862.64 |
| 4,170,270 | 10/1979 | Sette et al. . | |
| 4,184,557 | 1/1980 | Kunz . | |
| 4,237,989 | 12/1980 | Lewis | 73/862.64 |
| 4,300,648 | 11/1981 | Gallo et al. | 177/229 |
| 4,308,929 | 1/1982 | Estavoyer | 177/210 C |
| 4,343,196 | 8/1982 | Wirth et al. | 73/862.62 |
| 4,344,496 | 8/1982 | Langlais et al. | 177/210 C |
| 4,448,085 | 5/1984 | Lee | 73/862.64 |

FOREIGN PATENT DOCUMENTS

| | | |
|---|---|---|
| 1089396 | 11/1967 | United Kingdom . |
| 1201308 | 8/1970 | United Kingdom . |
| 1351708 | 5/1974 | United Kingdom . |
| 1530796 | 11/1978 | United Kingdom . |
| 2023843 | 1/1980 | United Kingdom . |
| 1563894 | 4/1980 | United Kingdom . |

Primary Examiner—Charles A. Ruehl
Attorney, Agent, or Firm—Kenway & Jenney

[57] ABSTRACT

A force transducer has (1) a pair of opposed rigid-body force summing members that each include a sensor member and (2) a pair of beam members that each extend between and couple the force summing members. These sensor members have opposing sensing portions which are mutually offset. A force-to-be-measured is applied to a summing member, either directly or through a rigid input force member. The force deforms the beams so that the sensing members are displaced with respect to each other while maintaining their parallel relationship. In one form the entire force transducer is formed from a single piece of material. A conductive material coated on a pair of small ceramic inserts that are bonded to the sensor portions form an accurate capacitor to measure the applied force. In another form, the sensor members are secured to the flexible beams. When the length of the force summing members exceeds the length of the flexible beam members, a deflection of the transducer in response to the applied force produces an amplification of this deflection at the opposed sensor portions. In yet another form, the transducer has a "sandwich" construction where the beams are each an integral, monolithic member with a thin, central portion that is flexible about only one axis and a pair of end pieces that have a much larger cross-sectional area than the thin central portions. A thin layer of bonding material couples these large end pieces to an interposed force summing member.

31 Claims, 10 Drawing Figures

FORCE TRANSDUCER

REFERENCE TO RELATED APPLICATION

This application is a continuation-in-part of U.S. patent application Ser. No. 359,619 filed on Mar. 18, 1982, now U.S. Pat. No. 4,463,614, which is a continuation-in-part of U.S. patent application Ser. No. 265,087 filed on May 19, 1981, now U.S. Pat. No. 4,448,085. The subject matter of this application is related to that of U.S. patent application Ser. No. 265,088 (SET-113), Weighing System, filed on May 19, 1981, now U.S. Pat. No. 4,382,479.

BACKGROUND OF THE INVENTION

The present invention is in the field of transducers, and more particularly relates to high resolution, high accuracy force transducers.

One prior art form of force or weight sensing utilizes a feedback approach using a movable coil in a fixed magnetic field. The coil is movable along a sensing axis and is driven by a current sufficient to maintain a fixed position along the sensing axis. In this configuration, the coil drive current provides a measure of forces applied to displace that coil. While this approach is generally effective, the force sensing configuration is relatively complex and correspondingly expensive.

Another form in the prior art is a strain gage load cell. In this form, however, the accuracy of the load cell is limited by hysteresis and creep of the strain gage sensor material, as well as that of bonding material for the sensor.

Yet another force sensing approach utilizes a variable capacitance type load cell, wherein a pair of opposed, substantially parallel, conductive plates are coupled so that the force-to-be-measured causes a separation of those opposed conductor plates in a manner which is proportional to an applied force. While in principle this approach is satisfactory, there are no straight forward assemblies known in the prior art which adequately maintain the sensing plates parallel over a range of forces.

Accordingly, it is an object of this invention to provide an improved force sensor.

It is another object to provide a variable capacitance force sensor.

SUMMARY OF THE INVENTION

Briefly, in accordance with the present invention, a force transducer includes a pair of opposed rigid-body force summing members lying along a central axis. Each of these summing members includes a sensor member extending along the central axis toward the other summing member. These sensor members include opposing sensing portions which are mutually offset in the direction of a first reference axis perpendicular to the central axis. A pair of beam members extend between and couple the force summing members, with one beam member being on one side of the sensor members and the other beam member being on the other side of the sensor member. The beam members are flexible about axes parallel to a second reference axis (perpendicular to the first reference and central axes), and are substantially rigid otherwise. In the preferred form of the invention, the beam members are substantially equal in length, and the distance between their points of coupling to the sensor members are substantially equal, so that the beam members are generally parallel.

Attached to one of the force summing members is a rigid input force member which transmits a central applied force to one end of the sensor. The force input member allows the force to be applied to the middle of the beam members, rather than at their ends, to minimize direct tension and compression in the beams. In one form, this force input member is a generally L-shaped component (when viewed along the second reference axis), although the precise configuration of this component is not critical. Attached to the other force summing member is a rigid support member which transmits a reaction force to the opposite end of this other force summing member. In a preferred form, one force summing member and the adjacent input force member are part of the same monolithic structure as are the other force summing member and its associated support member. This construction allows the transducer to be formed from two monolithic component pieces that are fused or otherwise joined at the beam members. The location of the input force member and the support member are preferably such that they do not extend over the area of this junction and impede this phase of the manufacturing process.

In one form of the invention, each of the opposing sensor portions supports an electrically conductive member, in a manner providing a pair of opposed, substantially parallel, planar conductive surfaces. The conductive surfaces are offset in the direction of the first reference axis, and also are parallel to the second reference axis. In this form of the invention, the force transducer may be a monolithic dielectric structure with the conductive members being thin conductive films deposited on the opposed portions of the sensor members.

In this configuration, the force transducer may be supported at one summing member by a force parallel to the first reference axis which is applied to the rigid support member. A force-to-be-measured is applied through the rigid input force member to the other summing member parallel to that first reference axis. As that force is applied to the summing members, the beam members deform, due to their flexibility about axes parallel to the second reference axis. As the beam members deform, the sensing members and the conducting members supported by those sensing members are displaced with respect to each other in the direction of the first reference axis, while maintaining their parallel relationship. The capacitance of the effective parallel plate capacitor formed by these conductive members may be measured conventionally. The measured capacitance value is inversely proportional to the separation of the plates, and thus the force-to-be-measured.

In yet another form the entire force transducer, including both force summing members, is formed from a single piece of material. This embodiment may be molded from ceramic materials with the same configuration and component portions described above. In this "one-piece" embodiment, the conductive surfaces are preferably a coating of a conductive material on a pair of small ceramic inserts that are bonded to "one-piece" transducer so that the relatively small airgap (0.003 to 0.006 inch) needed for an accurate capacitor measurement can be achieved.

Another embodiment of the force transducer according to the present invention uses a parallelogram frame structure where (1) the length of the force summing members along the first reference axis either exceeds or is less than the length of the flexible beam members along the central axis and (2) the sensor members are secured to the flexible beams and project towards one another generally in the direction of the first reference axis with their associated sensing portions overlapping to provied a variable capacitance gap between conductive elements mounted on the sensing portions. With this structure, and when the length of the force summing members exceeds the length of the flexible beam members, a deflection d of one force summing member with respect to the other force summing member produces a change in the gap g between the conductive elements that is greater than d. This mechanical motion amplification is particularly useful for "stiff" transducers that are designed to measure large forces. This embodiment is preferably formed of two identical sensor members and two other identical members that include the force summing members and two beams portions formed integrally with each force summing member. Also in the preferred form of this embodiment, the sensor members are secure between the end faces of opposed beam portions near the point of inflection of the resulting flexible beam to minimize errors introduced by the sensor-beam joints.

In yet another form, a low cost embodiment that is preferred for many applications, the transducer has a "sandwich" construction. The force summing members, as in the other embodiments, support sensor members that oppose one another. The difference lies in the structure of the flexible beam members that link the force summing members and in the way the beam members are attached to the force summing members. The beams are each an integral, monolithic member with a thin, central portion that is flexible about axes parallel to the second reference axis. Each beam also includes a pair of end pieces that have a much larger (preferably at least four times greater) cross-sectional area than the thin central portions when viewed either along the main axis of the beam or along the first reference axis. This change in cross-sectional area along the beam axis tends to concentrate the stress resulting from a flexure of the beam in the thin central portion at a points near the end pieces. (The central portions as a whole undergo an S-shaped deformation upon flexure in response to the force-to-be-measured to provide a parallelogram motion that in turn produces a parallel movement of the sensor members with respect to one another along the first reference axis.) The large cross-sectional area of the end pieces along the second axis is important to provide a face with a large area to bond to the adjacent force summing member. As a result, a thin layer of bonding material between this face and an opposed face of the adjacent force summing member also has a large area as compared to the cross-sectional area of the thin central portion of the beam. Both the location of the point of maximum stress and the area of the thin bonding layer allow a reliable joint between these components with a minimum of hysteresis loss. While the bonding material can be an epoxy or the like, it is preferably a glass with a low differential coefficient of expansion (near that of the material of the beam and force summing members) and a low melting point.

The force transducers of the present invention may be characterized by relatively low hysteresis, and very low creep under load, for example, where the force transducer is a monolithic structure made out of quartz. In that form, there is relatively low thermally induced change in capacitance for given forces applied to the summing members. The force transducer is responsive primarily to the net force from the single sensing (first reference) axis, and has a relatively high rejection ratio for forces and moments in other planes.

The force transducer of the present invention may be used as a force sensor in the form of a load cell for direct measurement of force. Alternatively, the transducer may be used to sense other forces such as inertial forces (when used in conjunction with a mass), or pressures when used in conjunction with a diaphragm.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
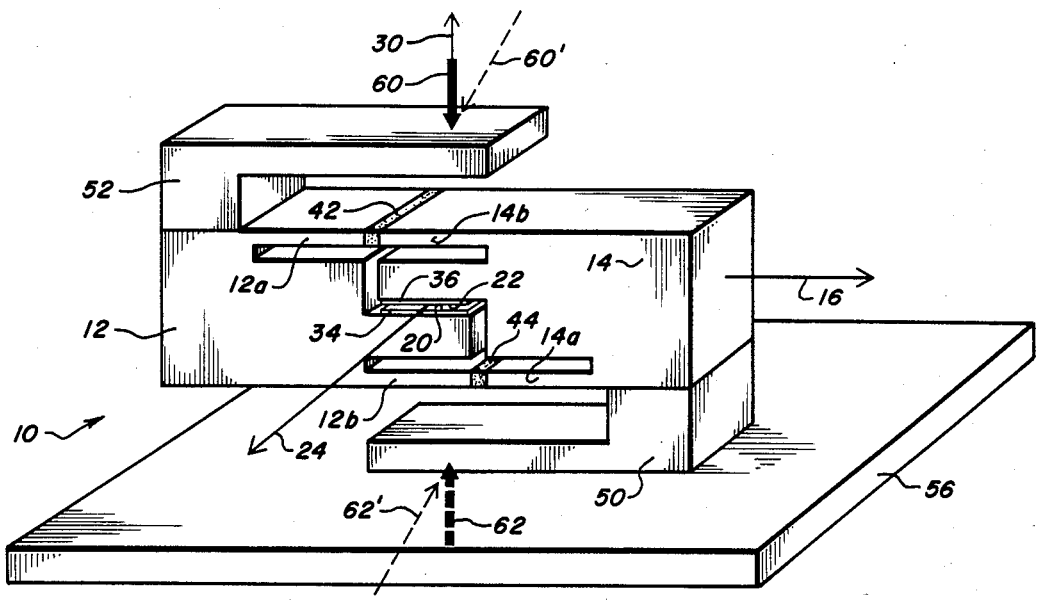
FIG. 1 shows an exemplary force transducer in accordance with the present invention.

FIG. 1 shows a transducer 10 in accordance with the present invention. The transducer 10 includes a pair of rectangular cross-section, elongated members 12 and 14, extending along a common central axis 16. Elongated member 12 is shown also in FIG. 2. Members 12 and 14 include complementary faces at their adjacent ends. As shown, the entire end portions of members 12 and 14 form the complementary faces, although in other embodiments, the complementary faces may be only a portion of the adjacent ends.

In the illustrated embodiment, the faces of members 12 and 14 include planar portions 20 and 22, respectively, which are offset in the direction of a first reference axis 30, which axis is perpendicular to central axis 16. The planar portions 20 and 22 are parallel to a second reference axis 24, which is perpendicular to axes 16 and 30. In the preferred embodiment, the planar portions 20 and 22 are also parallel to central axis 16, although in other embodiments, the planar portions may be angularly offset from axis 16. As shown, the faces on either side of faces 20 and 22 are parallel to axis 30 and perpendicular to axis 16, although other orientations of these faces might also be used. In the present embodiment, members 12 and 14 are substantially identical. These members are joined to form the transducer 10.

The elongated members 12 and 14 each include two planar slots extending from their complementary faces in planes parallel to the axes 16 and 24.

Figure 2:
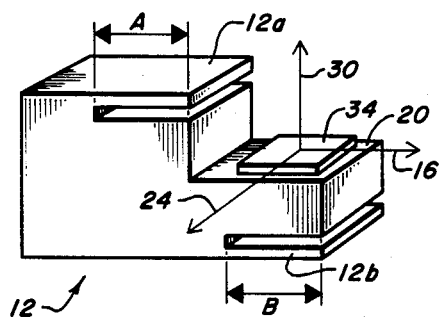
FIG. 2 shows one of the force summing members and beam portions of the embodiment of FIG. 1.

In the embodiment illustrated in FIGS. 1 and 2, both slots in each of members 12 and 14 are of identical depth. However, in other embodiments, in each of members 12 and 14, one slot may have a depth A and the other slot may have a depth B, where at least one of A and B is non-zero and where the sum of A+B equals a predetermined value. Moreover, the two slots in member 12 are spaced apart in the direction of axis 30 so that the upper beam portion 12a and the lower beam portion 12b of member 12 (i.e. the beam portions bounded by the slots and outer surfaces of members 12) are relatively flexible in response to moments about axes parallel to the axis 24.

In the present embodiment, members 12 and 14 are substantially identical. As a result, the two slots of member 14 are considered to define "upper" beam portion 14a and "lower" beam portion 14b.

The planar portions 20 and 22 of members 12 and 14 each support one of substantially planar electrically conductive members 34 and 36.

The upper beam portion 12a and lower beam portion 14b of members 12 and 14, respectively, are joined by member 42 and the lower beam portion 12b and upper beam portion 14a of membes 12 and 14, respectively, are joined by member 44. In the resultant configuration, the complementary faces of members 12 and 14 are mutually offset in the direction of axis 16 and the opposed conductive surfaces of members 34 and 36 are mutually offset in the direction of axis 30. In the preferred form, the members 12 and 14 are quartz, and the adjoining members, 42 and 44, are also quartz so that the members may all be fused together to form a monolithic structure. In alternate embodiments, other materials, such as titanium silicate, ceramics or other dielectric materials may be used.

As shown in FIG. 1, the transducer 10 also includes a rigid support member 50 rigidly attached to member 14 and a rigid input force member 52 rigidly attached to member 12. These members 50 and 52 may also be quartz and fused to the respective ones of blocks 12 and 14. The support member 50 is coupled to the upper planar surface of a transducer support element 56.

Figure 3:
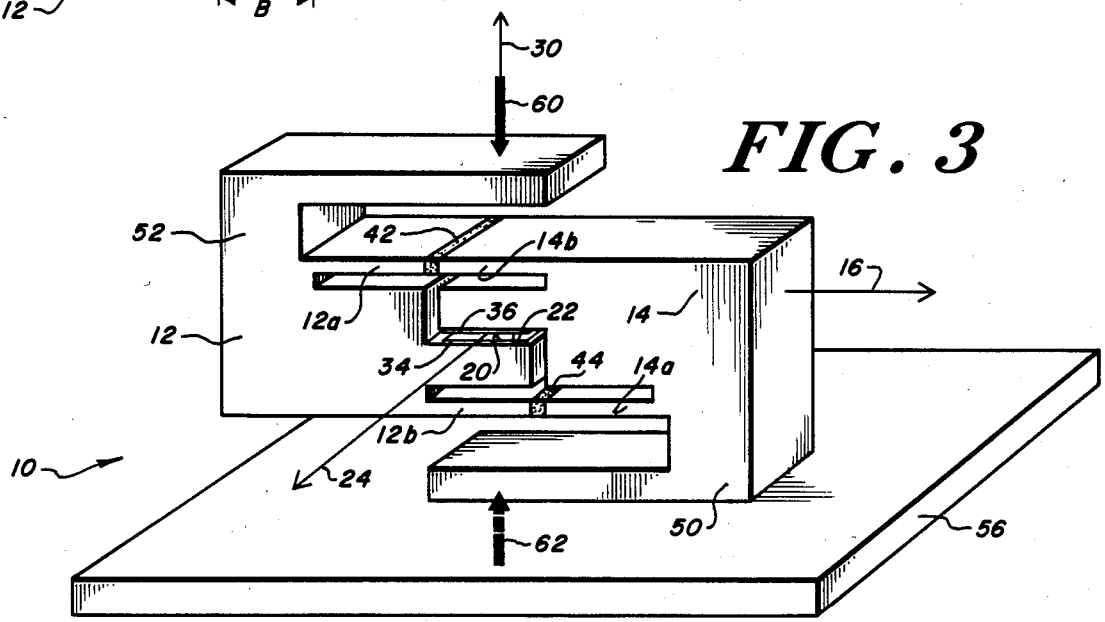
FIGS. 3-6A show alternative embodiments of the force transducer of FIG. 1.

FIG. 3 shows an alternative embodiment similar to the FIG. 1 embodiment except that support member 50 is formed integrally with the member 14 from a single homogeneous piece of a dielectric material and the rigid input force member 52 is formed integrally as part of member 12, also from a single homogeneous piece of a dielectric material. Suitable such materials are quartz and ceramics. This construction avoids problems associated with bonding dissimilar materials and the possibility of operational problems once the bond has been made. Such operational problems can include a rupture or change in the condition of this bond due to differences in the response of the materials to variable parameters such as temperature, or simply due to use and aging over a period of time.

Figure 4:
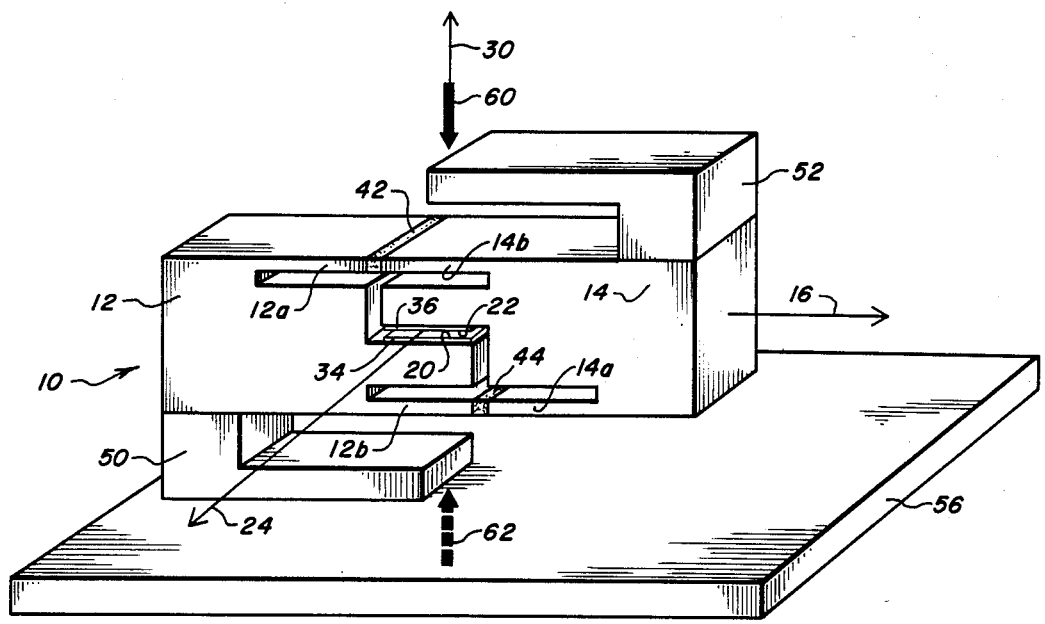

FIG. 4 shows another alternative embodiment similar to the FIG. 1 embodiment except that the rigid support member 50 is rigidly attached to the member 12 and the rigid input force member 52 rigidly attached to the member 14. In other words, the members 50 and 52 are mounted on opposite ends of the members 12 and 14 than in the FIG. 1 embodiment. In contrast to the FIG. 3 embodiment, the members 50, 52, 12 and 14 are not formed from two homogeneous pieces of material. Also, with the member 52 mounted at the upper right hand end of the member 14 (as shown), the member 52 does not extend far enough to interfere with the fusing or joining of the beam members 12a and 14b at 42.

Figure 5:
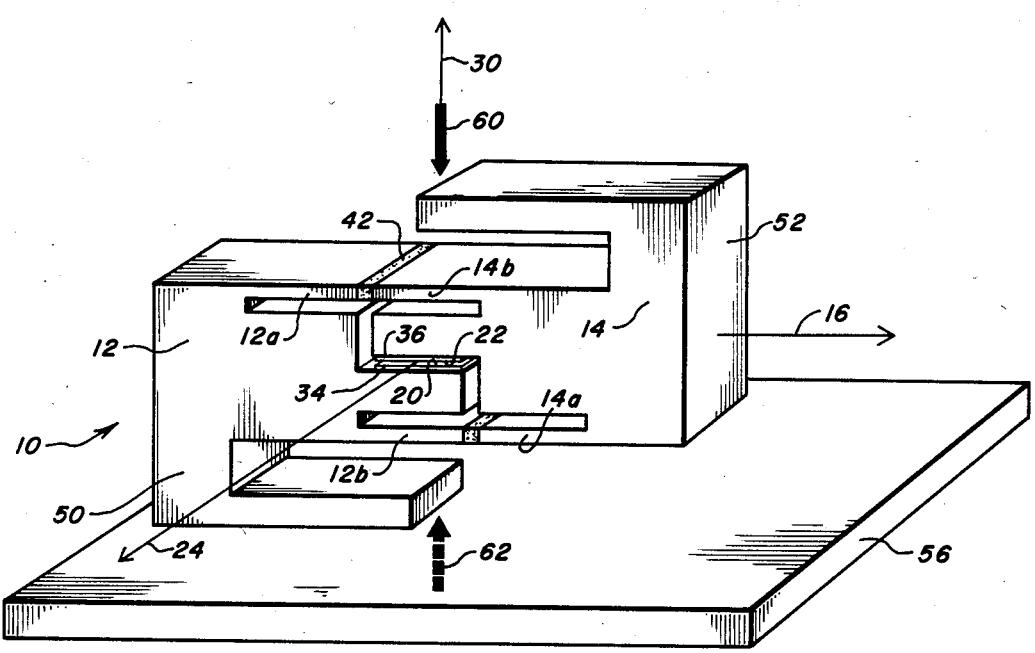

The embodiment of FIG. 5 is similar to the FIG. 4 embodiment except that the rigid support member 50 and member 12 are formed integrally out of the same homogeneous piece of dielectric material as are rigid input force member 52 and member 14. As in the FIG. 3 embodiment, this construction allows the transducer 10 to be formed from only two component fabrications (each having three open-ended slots) that are fused together or otherwise joined at 42 and 44. This avoids the problems noted above with respect to the FIG. 3 embodiment. The dielectric material may be quartz or a ceramic.

Figure 6:
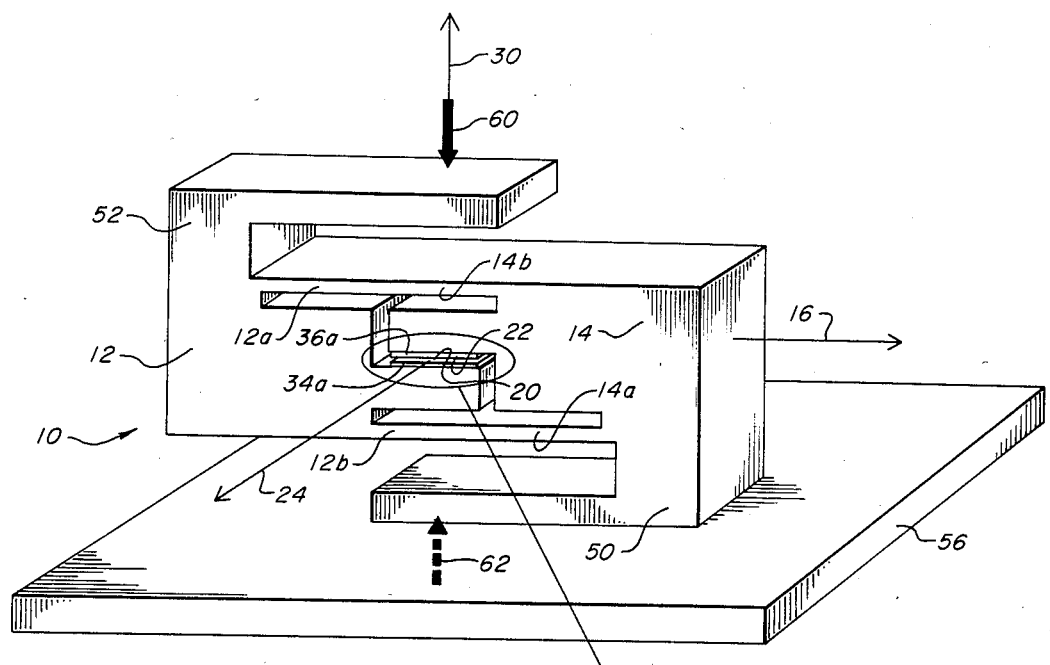
Figure 6A:
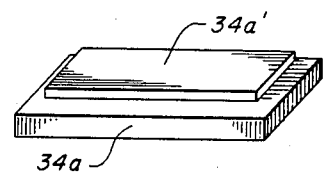

FIG. 6 shows yet another embodiment where the force summing members 12 and 14 as well as the force input member 52 and the support member 50 are all formed integrally from a single piece of homogeneous dielectric material. While the appropriate openings might be fabricated from a single block of quartz, this embodiment is particularly useful where the transducer 10 is formed from a molded ceramic. Since the electrically conductive members 34a, 36a must be very closely spaced (typically 0.003 to 0.006 inch), directly molding a gap that is sufficiently narrow and properly forming or positioning the conductive surfaces within the gap can be difficult. To avoid this problem, the capacitive gap is preferably fabricated to be wider than the actual spacing of the opposed conductive surfaces. A pair of inserts 34a, 36a (FIG. 6A) are bonded in place within the gap. The inserts are preferably formed from the same dielectric material as the other components of the transducer. Each insert carries a layer of a conductive material 34a', 36a' on one face and these conductive layers, of course, face one another. The thickness of the inserts 34a, 36a is selected to produce the correct close spacing between the conductive layers while facilitating the fabrication of this "one-piece" transducer.

The operation of the transducer 10 of the present invention can be best understood with reference to FIG. 1. A force-to-be-measured, indicated by arrow 60, is applied along the axis 30 to the input member 52. That force is transmitted to the left hand (as illustrated) portion of member 12. In response to the applied force applied to the member 52, an equal and opposite force (indicated by arrow 62) is applied to the support member 50 at the upper surface of element 56. The latter force is transmitted to the right hand (as illustrated) portion of member 14. The members 50 and 52 apply the effective force-to-be measured to the center of the transducer rather than its ends. Due to the symmetry of this construction, the direct (non-bending) tension and the direct compression introduced into the two beam members is minimized.

In response to the force pair applied to the transducer 10, the upper and lower beam members of transducer 10 deform in a manner so that the conductive members 34 and 36 separate by a distance related to the magnitude of the force pair applied to the transducer 10, while maintaining their parallel relationship. More specifically, the beam members deflect in an S-shaped curve with stresses concentrated at the ends of each beam near the associated force summing member. Near the center of each beam member is a point of inflection which experiences substantially no bending stress. The magnitude of the capacitance of the effective capacitor formed by members 34 and 36 may be measured conventionally, and provides a measure of the force applied to member 52.

In the embodiments shown in FIGS. 4 and 5 the force-to-be-measured is transmitted via the force input member 52 to the right-hand (as illustrated) portion of member 14. In response to the force applied to member 52, an equal and opposite force (indicated by arrows 62) is applied to the support member 50 at the upper surface of element 56. The latter force is transmitted to the left hand (as illustrated) portion of member 12. In response to the force pair applied to the transducer 10, the upper and lower beam members of transducer 10 deform in a manner so that the gap between the conductive members 34 and 36 is reduced by a distance related to the magnitude of the force pair applied to the transducer 10, while maintaining their parallel relationship. The measured capacitance value is inversely proportional to the gap between the members 34 and 36.

Because the transducer 10 is highly resistant to moments and forces in directions other than along axis 30, the applied force pair (represented by arrows 60 and 62) need not be along axis 30. For example, with forces in the directions of broken arrows 60' and 62' of FIG. 1, the separation between conductive members 34 and 36 is inversely proportional to the applied force components in direction of axis 30.

As the upper and lower beam members deform, as noted above, there is stress in those members. In the illustrated embodiment, due to the symmetry of the system where the slot depths A and B are equal and blocks 12 and 14 are substantially similar, the junctions formed by the joining members 42 and 44 occur at bending stress inflection points, i.e. where bending moments are zero. In other forms of the invention, for example, where the slot depths A and B differ and particularly where one of the slot depths A or B may equal zero, the junction of the elements does not occur at these stress inflection points. Under this condition, the junction formed by joining members 42 and 44 is lightly stressed and a relatively low quality, and thus inexpensive, junction may be used.

Where the invention is constructed from quartz, for example, the force transducer 10 is characterized by very low hysteresis and very low creep under load, with precision index on the order of $10^{-5}$ to $10^{-6}$. Moreover, the device is characterized by a relatively low thermally-induced changing capacitance.

The force transducer 10 generally responds only to net force along the single axis 30 and maintains a relatively high rejection ratio for forces in other planes. The elements 12 and 14 of the present embodiment may be readily constructed of a rectangular elongated quartz block which is cut to form the complementary surfaces. The two blocks having those complementary surfaces merely have a pair of slots cut to form the upper and lower beam portions. The beam portion-forming slots may be on opposite sides of the sensing portion, as shown, or may be on the same side. In the FIG. 3 and FIG. 5 embodiments, the two blocks each have three open ended slots.

The blocks are joined to form a transducer by joining the beam portions, for example, by fusion, to form a rugged, monolithic structure. In other forms of the invention, other materials, including metals, may be used for members 12 and 14, provided at least one of members 34 and 36 is insulated from the other. The elements 50 and 52 may be metal or other material.

Figure 7:
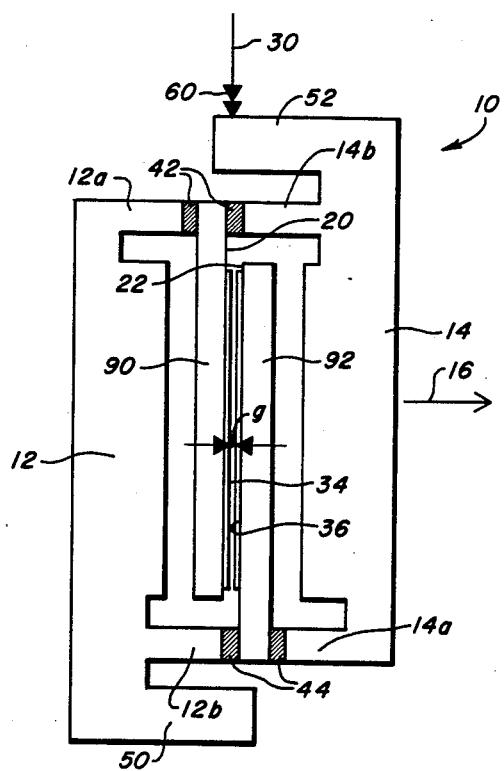
FIG. 7 shows a further alternative embodiments of the force transducer of the present invention where the sensing members are mounted on the flexible members rather than the rigid force summing members and the transducer produces an amplification of the displacement produced by the applied force.
Figure 7A:
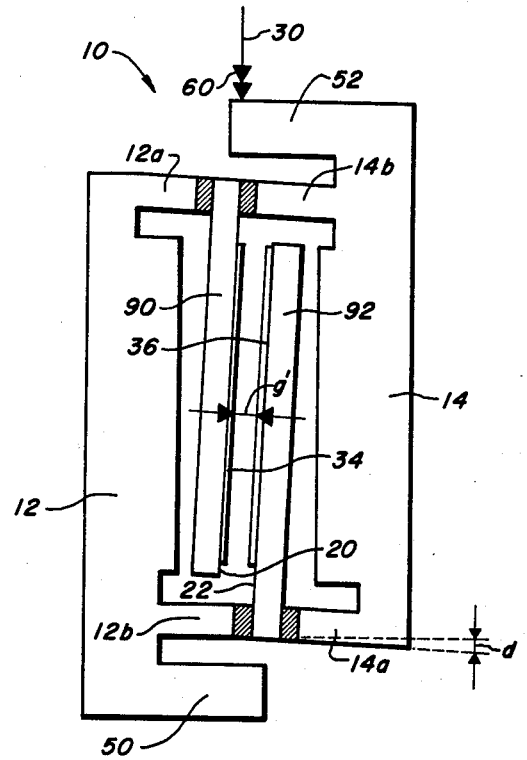
FIG. 7A shows the embodiment of FIG. 7 in a flexed position.

FIGS. 7 and 7A shows a further embodiment of the present invention (like parts being designated with the same reference number) characterized by sensor members 90 and 92 being mounted on the flexible beam members rather than the generally rigid force summing members. With the dimensional relationships shown in FIGS. 7 and 7A, this embodiment produces a mechanical amplification of the displacement generated in the transducer by the force-to-be-measured. The sensor members include a sensing portion defined by the faces 20 and 22, respectively. As in the embodiments discussed previously, the faces 20,22 are preferably planar, parallel to one another and closely spaced, but non-planar configurations are also possible. Also, each face preferably supports an electrically conductive member 34 or 36. The conductive portions can be metallic coatings, foils, or the like mounted directly on the faces 20,22 or on inserts as described above with reference to FIG. 6. Also, while the sensor members are shown as being straight and generally aligned with the reference axis 30, they can have a more complex shape or be mutually inclined with respect to this reference axis. Stated in more general terms, the sensor members 90, 92 can each extend generally in a direction that forms an angle of 0° to 90° with respect to the first reference axis. Preferably, as shown, the sensor portions (faces) 20, 22 and the conductive members 34, 36 carried on these faces overlap one another for a substantial portion of the length of the sensor members 90, 92 to provide an enhanced absolute value of the capacitance changes being measured. This is important so that the capacitance variations being produced and measured are greater than capacitances in the lead wires or measuring circuitry which could otherwise introduce troublesome noise or errors in the final measured value.

While the sensors members can be formed of a different material than the flexible members, they preferably are formed of the same material, for example, quartz bonded to quartz, ceramic bonded to ceramic, or as a single, integral construction of one homogeneous piece of material that is fabricated (including molding) to form the flexible member and the associated sensor member. In a "one-piece" embodiment such as that shown in FIG. 6, all of the elements of the transducer 10 can be formed of a molded ceramic. The force input and support members 52 and 50 in this embodiment function in the manner described above. They also can be molded or otherwise, formed integrally with the transducer to avoid the bonding problems noted above. In the preferred form shown in FIGS. 7 and 7A, the members 52 and 50 are formed integrally with their associated force summing members from quartz.

In the FIG. 7 embodiment, the aspect ratio of the transducer 10 is quite different from that of the FIGS. 1–6 embodiment. Specifically, the force summing members each extend in the direction of the reference axis 30 (aligned with the input force 60) for a relatively large distance that exceeds the length of the flexible beams measured in the direction of the central axis. This geometry, in combination with the attachment of the sensors, which are themselves elongated to overlap over a significant distance, provides the desired motion amplification effect. (To achieve a motion reduction, the length of the force summing members along the first reference axis should be less than the length of the flexible beams along the central axis.) FIG. 7 shows the transducer in a relaxed or unflexed position corresponding to the absence of an applied force 60. The conductive members 34, 36 are spaced from one another by a gap g. FIG. 7A shows the same transducer when it is flexed in response to the applied force 60. As shown in FIG. 7A, a downward displacement d of one rigid force summing member with respect to the other force summing member results in an increase in the dimension of the gap to a value g' where g'-g is greater than d. This arrangement therefore provides a mechanical amplification of the effects of the applied force 60. This is a particularly useful operational feature where the applied force is large and the transducer must be relatively "stiff" to resist the large applied force.

It should also be noted that in the embodiment shown in FIG. 7, the sensor members are mounted at one end between beam portions 12a, 12b, 14a and 14b that are formed integrally with the rigid force summing members 12 and 14. The sensors are bonded between the end faces of the beam portions at 42, 44 with materials such as those discussed above. Of course, other arrangements are possible. For example, the beam members can be integral with a bond at their "interior" face to one end of a sensor member, or the beam members can be formed integrally with the sensor members.

In the form shown in FIGS. 7 and 7A, it is also significant to note that the entire transducer is formed from four component parts, two identical force summing members with integral beam portions and two identical sensor members, secured together by the joining material. As with the FIG. 5, embodiment, this symmetry lends itself to a comparatively low cost of manufacture. Also in the FIG. 7 embodiment, the sensor members are preferably mounted at or near the point of inflection of the associated flexible member. This location places the bonds between the flexible members and the sensor member in a position of minimal or relatively low stress. The reliability and accuracy problems that would otherwise arise from these joints are therefore minimized. To this end, the beam portions 12a, 12b, 14a and 14b are preferably of substantially equal length.

Figure 8:
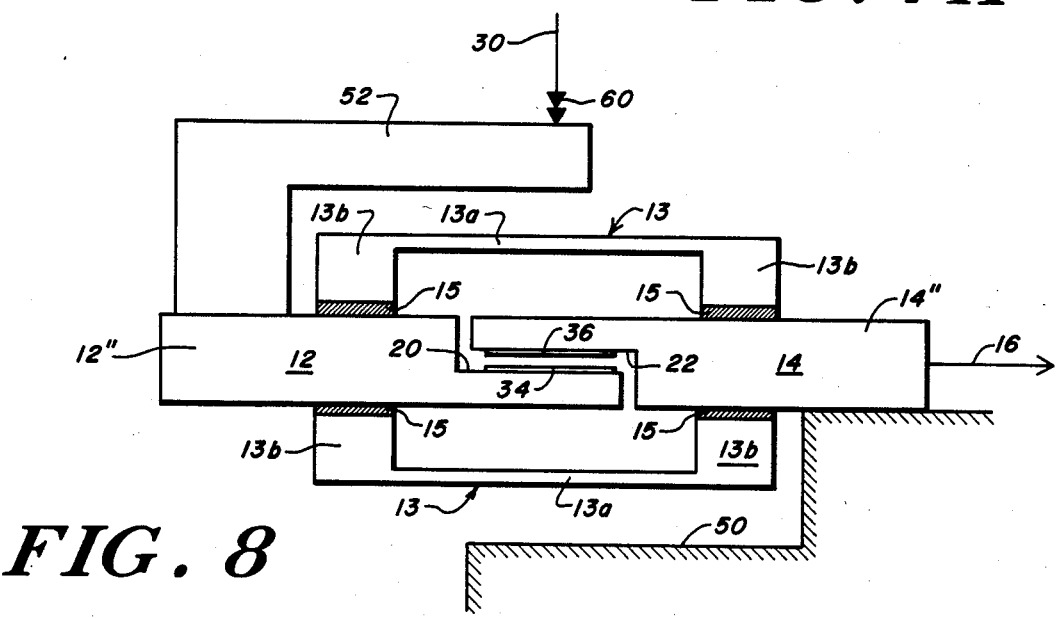
FIG. 8 shows yet another embodiment of the force transducer of the present invention where the transducer has a "sandwich" construction.

FIG. 8 shows yet another embodiment of a force transducer 10 according to the present invention with like parts again being designated by the same reference numbers. The transducer of this embodiment utilizes a "sandwich" construction and provides good performance characeristics with low manufacturing costs. This embodiment is preferred for many applications such as very low force sensors.

In this FIG. 8 embodiment, the force summing members 12 and 14 are again generally elongate elements formed of a suitable dielectric material such as quartz. Each member extends along the common central axis 16. The members 12 and 14 preferably have a rectangular cross section. As in the FIGS. 2–6 embodiments, the sensor portions are formed on mutually opposed complementary faces 20 and 22 formed on the adjacent ends (sensor portions) of the members 12 and 14. The faces 20 and 22 are spaced apart in the direction of the reference axis 30. They are preferably planar and they each support a conductive member 34,36 to provide a variable capacitor. The extreme outer ends 12" and 14" of the force summing members provide a site for mounting the force input member 52 and the support member 50 (shown simply as a portion of a rigid support structure configured to provide the necessary support and clearances). The members 52 and 50 are secured on opposite sides of the force summing members lie generally in a plane defined by said central axis and said first reference axis.

In the FIG. 8 embodiment, flexible beams 13,13 connect the force summing members. Each beam 13 is a monolithic one-piece element that extends generally along the central axis 16. A thin, flexible central portion 13a of each beam bridges the members 12 and 14. Each beam 13,13 terminates at both of its ends in substantially rigid, integral end piece 13b,13b. It is significant that these end pieces, whether measured in a plane transverse to the common axis 16 or one transverse to the reference axis 30, are substantially larger in cross-sectional area than the thin flexible portion 13a measured in a plane transverse to the central axis. These areas preferably have a ratio of at least 4:1. This construction, with large areas at the end sections, tends to distribute the moment produced by the applied force into a large bonding area. This reduces the stress at the joint.

The large cross-sectional area of the end pieces in the direction 30 is important in securing the component parts of the transducer to one another in a manner that is economical and also provides good performance. More specifically, in this "sandwich" embodiment, there is a joint formed by a thin layer of cement or bonding material 15. As discussed above with respect to other embodiments, the type of material will vary depending on the type of material forming the flexible beams and the force summing members members as well as the degree of accuracy required of the transducer.

Regardless of the choice of material 15, a significant design problem is hysteresis losses in the material. A significant aspect of this design is the discovery that (1) if the layer of the material 15 is thin and (2) if area of the bonding layer 15 (measured in a plane perpendicular to the axis 30) is substantially larger than the cross-sectional area of the flexible beam portion 13a, then the hysteresis errors produced by the joint can be attenuated by as much as a ratio of 10,000:1 (provided that a flexure beam 13 of the type described above is used to distribute the moment produced by the applied force over a large area). By way of illustration, but not of limitation, the beam members 13,13 can have an overall length of approximately 2.0 inches, a width in the direction of the second reference axis of 1.0 inch, a cross-sectional area of the thin portion 13a of 0.05 inch$^2$, and a cross-sectional area at the face of the rigid end piece adjacent by bonding material of 0.25 inch$^2$.

In a preferred form of this embodiment, the beam members and the force summing members are formed of quartz and the bonding material 15 is a low coefficient of expansion glass (at or near the coefficient of quartz) that also has a low melting point. Conventional epoxy materials or the adhesive sold under the trade designation "Eastman 910" will also work, but with some increased hysteresis loss. The same bonding material can also be used to secure the force input and support members 52,50 to the projecting end portions 12" and 14" of the sensor members.

Production economies of this embodiment derive from the simple fabrication required to produce the component parts, the use of identical parts for both force summing members and both flexible beam members, and the ability to assemble these parts, using a suitable jig, to close tolerances by simply adhering them together, or in the preferred form by firing the assembled unit together at a temperature that causes the glass bonding material to fuse the component quartz parts together.

The invention may be embodied in other specific forms without departing from the spirit or essential characteristics thereof. The present embodiments are therefore to be considered in all respects as illustrative and not restsrictive, the scope of the invention being indicated by the appended claims rather than by the foregoing description, and all changes which come within the meaning and range of equivalency of the claims are therefore intended to be embraced therein.

I claim:

1. A force transducer comprising:
   A. a pair of opposed, rigid force summing members arrayed along a central axis,
   B. a pair of sensor members extending toward one another and including mutually opposing, spaced apart sensing portions, and
   C. first and second beam members disposed on opposing sides of and extending parallel to said central axis and coupling said force summing members, said first and second beam members being relatively flexible about axes parallel to a second reference axis perpendicular to said central axis, and said first and second beam members being substantially rigid otherwise,
   said sensor members each being secured at one end to different ones of said first and second beam members and each extending generally at an angle of 0° to 90° with respect to a first reference axis perpendicular to said central axis and to said second reference axis, whereby relative movement of said sensing portions is related to the forces applied to said summing members,
   D. an electrically conductive member on each of said sensing portions, said conductive members providing opposed, substantially parallel surfaces, whereby the capacitance associated with the conductive members is related to the forces applied to said summing members,
   wherein said first and second beam members undergo a generally S-shaped deflection in response to an applied force that deflects one of said force summing members with respect to the other force summing member thereby causing a corresponding change in the spacing of said conductive members carried on said sensor members and whereby said relative movement of said force summing members is generally parallel.

2. A force transducer according to claim 1 wherein said force summing members extend generally in the direction of said first reference axis for a first distance that differs from a second distance that said first and second beam members extend parallel to said central axis, whereby a deflection d of one of said summing members in response to one of said applied forces relative to the other of said force summing members produces a change g'-g in the mutual separation between said conductive members carried on said sensing portions of said sensor members that is greater than d when said first distance is greater than said second distance and is less than d when said first distance is less than said second distance.

3. A force transducer according to claim 1 wherein said first and second beam members are substantially equal in length and each formed from two beam portions that are each formed integrally with one of said force summing members, and further comprising means for joining said beam portions at their free ends to form said first and second beam members.

4. A force transducer according to claim 3 wherein said beam portions have generally the same length measured along said central axis and said joining means is located near the point of inflection of said first and second beam members.

5. A force transducer according to claim 3 wherein each of said sensor members are between the opposed end faces of one of said pair of beam portions for a substantial portion of their length.

6. A force transducer according to claim 3 wherein said sensor members are each generally straight and said mutually opposed sensing portions extend along said sensor members for a substantial portion of the length of the sensor members to provide a comparatively large absolute capacitance value.

7. A force transducer according to claim 5 wherein said sensor members are each generally straight and said mutually opposed sensing portions extend along said sensor members for a substantial portion of a length of the sensor members to provide a comparatively large absolute capacitance value.

8. A force summing member according to claim 1 wherein said sensor members are each generally straight and said mutually opposed sensing portions extend along said sensor members for a substantial portion of the length of the sensor members to provide a comparatively large absolute capacitance value.

9. A force transducer according to claims 1, 6, 7 or 8 further comprising a rigid force input member secured to one of said force summing members and a rigid support member secured to the other of said force summing members, said force input and support members each having portions that extend to a point generally aligned with and spaced from the middle of said first and second beam members so that said applied force and its reaction force do not produce any substantial tension or compression in said first and second beam members.

10. A force transducer according to claim 9 wherein said force input member and said support member are each formed integrally with an associated one of said force summing members.

11. A force transducer according to claim 10 wherein said force summing member with said integral force input member and associated beam portions is identical to the other said force summing member with said integral support member and said associated beam portions.

12. A force transducer comprising:
   A. a pair of elongated force summing members, each of said force summing members extending along a common central axis and having at least in part complementary faces at their adjacent ends, at least one of said faces having at least one sensing portion angularly offset from said central axis by less than ninety degrees,
   wherein each force summing member includes a pair of planar slots extending from its complementary face, the first slot having depth A and the second slot having depth B, where at least A or B is non-zero, said second slot being spaced apart in the direction of a first reference axis from said first slot, said first reference axis being perpendicular to said central axis,
   whereby upper and lower beam portions of said force summing member are relatively flexible about axes parallel to a second reference axis, said second reference axis being perpendicular to said central axis and said first reference axis, said upper beam portion being bounded on one side by said first slot and on the other side by a surface portion of said force summing member, and said lower beam portion being bounded on one side by said second slot and on the other side by a surface portion of said force summing member, B. means for joining the upper beam portion of each said pair of members and the lower beam portions of the other of said pair of members to form a monolithic structure, wherein said complementary faces are mutually offset in the direction of said first reference axis, and are movable in the direction parallel to said first reference axis and relatively immovable otherwise, C. a rigid support member attached to one end of one of said force summing members and a rigid force input member attached to the opposite end of the other of said force summing members, said support member and said force input member being on opposite sides of said sensing portions and adapted to apply said force and its reaction force in a manner that minimizes the direct tension and direct compression in said upper and lower beam portions where said direct tension and direct compression are produced other than by a bending of said beam portions, and D. a planar electrically conductive member located on said sensing portions of said complementary faces between said pair of slots, whereby the capacitance associated with said conductive members is related to the forces applied to said pair of members.

13. A force transducer according to claim 12 wherein said support member and said force input member each have a first portion attached to said one end of the associated member and a second portion that extends generally in the direction of said central axis toward said joining means.

14. A force transducer according to claim 13 wherein said support member extends in the direction of said central axis to a point that does not overlie said joining means for the adjacent ones of said beam portions.

15. A force transducer according to claims 13 or 14 wherein said force input member extends in the direction of said central axis to a point that does not overlie said joining means for the adjacent ones of said beam portions.

16. A force transducer according to claim 12 wherein said pair of force summing members are formed of a dielectric material, and said support member and said force input member are formed of metal.

17. A force transducer according to claim 12 wherein said pair of force summing members are formed of a dielectric material, and said support member and said force input member are also formed of a dielectric material.

18. A force transducer according to claims 16 or 17 wherein said dielectric material is quartz.

19. A force transducer according to claim 16 or 17 wherein said dielectric material is a ceramic.

20. A force transducer according to claim 17 wherein said pair of force summing members, said support member and said input force member are formed integrally from a single homogeneous piece of said dielectric material.

21. A force transducer according to claim 20 wherein said dielectric material is a ceramic.

22. A force transducer comprising:
A. a pair of opposed, rigid force summing members arrayed along a central axis,
B. a pair of sensor members carried on said force summing members and extending toward one another and including mutually opposing sensing portions that are spaced apart along a first reference axis perpendicular to said central axis, and
C. first and second beam members disposed on opposing sides of and extending parallel to said central axis wherein the central portion of said beam members is relatively thin and flexible about axes parallel to a second reference axis perpendicular to said central axis, and said first and second beam members being substantially rigid otherwise, said first and second beam members each having substantially rigid end pieces formed integrally with said central portion, said end pieces having cross-sectional areas in planes transverse to both said central axis and said first reference axis that are substantially larger than the cross-sectional area of said central portion measured in a plane transverse to said central axis, and D. a plurality of thin layers of bonding material located between and joining said end pieces to said sensor members, said layers also having an area measured in a plane transverse to said first reference axis that is significantly larger than the cross-sectional area of said central portion measured in a plane transverse to said central axis, whereby relative movement of said sensing portions is related to the forces applied to said summing members.

23. A force transducer according to claim 22 wherein said sensor members each have portions that project along said central axis beyond said end pieces.

24. A force transducer according to claim 23 further comprising a rigid force input member and a rigid support member, said force input and support members each being secured to different ones of said projecting sensor portions and on opposite sides of said force summing members in a plane that includes said central axis and said first reference axis.

25. A force transducer according to claims 22 or 24 further comprising an electrically conductive member on each of said sensing portions, said conductive members providing opposed, substantially parallel surfaces, whereby the capacitance associated with the conductive members is related to the forces applied to said summing members.

26. A force transducer comprising:
A. a pair of opposed, rigid force summing members, formed of a dielectric material, each of said summing members including a sensor member extending therefrom in the direction of a central axis, toward the other summing member, said sensor members including opposing sensing portions mutually offset in the direction of a first reference axis, said first reference axis being perpendicular to said central axis, B. a first beam member formed of a dielectric material and extending between and integrally coupling said force summing members, said first beam member being relatively flexible along its length about axes parallel to a second reference axis, said second reference axis being perpendicular to said central and first reference axes, and said first beam member being substantially rigid otherwise, C. a second beam member formed of a dielectric material and extending between and integrally coupling said force summing members, said second beam member being relatively flexible along its length about axes parallel to said second reference axis and being substantially rigid otherwise, D. said first and second beam members and said force summing members being formed as an integral, homogeneous one piece parallelogram structure that flexes elastically in response to said force applied generally along said first reference axis while at least one of said couplings between said first and second beam member and said force summing members being moment resisting to enable at least one of said first and second beam members to resist externally applied forces, whereby relative movement of said sensing portions is related to the forces applied to said summing members, and E. an electrically conductive member on each of said sensing portions, said conductive members providing opposed, substantially parallel surfaces, said surfaces being offset in the direction of said first reference axis, whereby the capacitance associated with the conductive members is related to the forces applied to said force summing members.

27. A force transducer according to claim 26 wherein said dielectric material is quartz.

28. A force transducer according to claim 26 wherein said dielectric material is a ceramic.

29. A force transducer according to claim 26 further comprising:

a rigid support member formed integrally with one end of one of said force summing members and a rigid force input member formed integrally with the opposite end of the other of said force summing members, said support member and said force input member being on opposite sides of said sensing portions, said pair of force summing members and said force input and support members being formed integrally of a single homogeneous piece of a dielectric material.

30. A force transducer according to claim 26 further comprising a pair of inserts that each carry one of said electrically conductive members, said inserts being secured with cementing material to an associated one of said sensing portions to facilitate the construction of said variable capacitance within a small gap between said sensing portions.

31. A force transducer according to claim 30 wherein said inserts are formed of the same dielectric material as said sensing portions.

* * * * *